Figure 1:
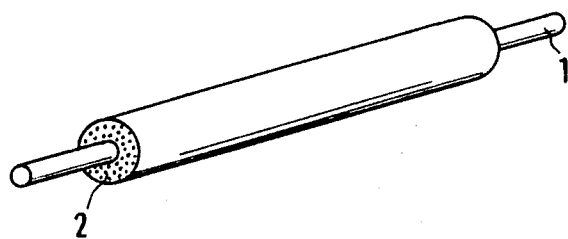

United States Patent [19]

Arenz

[11] Patent Number: 4,881,995

[45] Date of Patent: Nov. 21, 1989

[54] METHOD AND ASSEMBLY KIT FOR FORMING DEFINED LONGITUDINALLY WATERTIGHT SECTIONS IN WIRINGS COMPRISING A PLURALITY OF INDIVIDUAL STRANDS AND/OR CABLE STRANDS

[75] Inventor: Helmut Arenz, Alfter-Impekoven, Fed. Rep. of Germany

[73] Assignee: DSG Schrumpfschlauch GmbH, Meckenheim, Fed. Rep. of Germany

[21] Appl. No.: 92,454

[22] Filed: Sep. 3, 1987

[30] Foreign Application Priority Data

Sep. 18, 1986 [DE] Fed. Rep. of Germany ....... 3631769

[51] Int. Cl.$^4$ ............................................ H01B 13/06
[52] U.S. Cl. ......................................... 156/52; 156/83; 156/86; 156/229; 156/244.13; 174/DIG. 8; 206/568; 428/34.9; 428/36.91; 428/910; 428/913
[58] Field of Search ......................... 156/49, 52, 86, 83, 156/229, 244.13; 174/DIG. 8; 428/36, 910, 913, 34.9, 36.91; 206/223, 568

[56] References Cited

U.S. PATENT DOCUMENTS 4,634,615  1/1987  Versteegh et al. ............... 156/86 X
4,647,716  3/1987  Akiyama et al. ................. 156/86 X
4,650,703  3/1987  Kleinheins ....................... 156/52 X
4,656,070  4/1987  Nyberg et al. ................... 156/52 X

*Primary Examiner*—Robert A. Dawson
*Attorney, Agent, or Firm*—Scully, Scott, Murphy & Presser

[57] ABSTRACT

The invention relates to a method and an assembly kit for forming locally defined longitudinally water-tight sections in a wiring comprising a plurality of conductor strands, individual conductors and/or cable strands for the electric or electronic control of functions. Inserted between the conductor strands of such a wiring is a plastic element containing, or consisting of, a thermoplastic melt adhesive. This plastic element is caused to expand in response to being heated. A section of a heat-shrinkable component is mounted on the exterior of the wiring. Application of heat causes the shrinkable component to tightly contract around the wiring, and the plastic element positioned between the conductor strands to expand. The contraction of the heat-shrinkable component and the expansion of the plastic element result in the generation of pressure forces within the space enclosed by the heat-shrinkable component, whereby the heat-softened melt adhesive is sealingly forced into any existing voids.

24 Claims, 3 Drawing Sheets

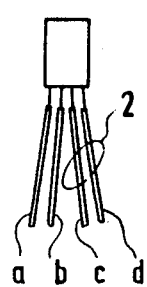
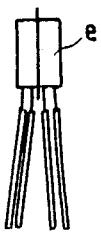
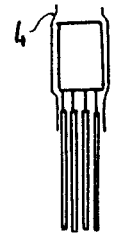
FIG.12a  FIG.12b  FIG.12b'  FIG.12c
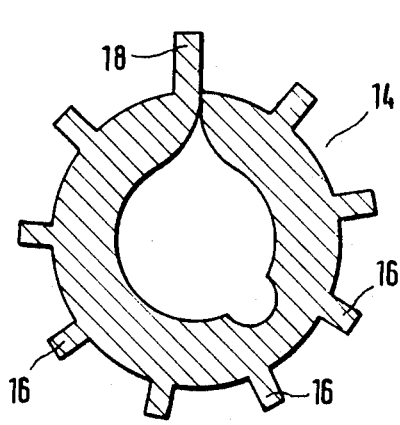
FIG. 14
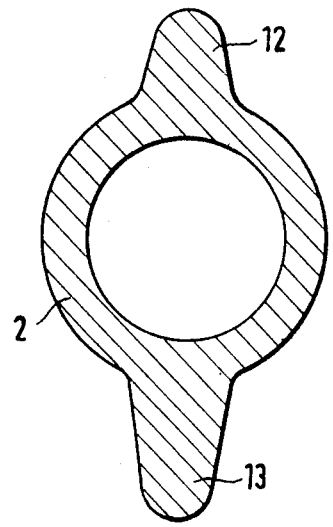
FIG. 13
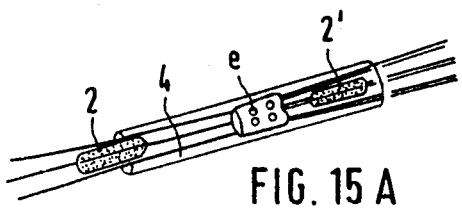
FIG. 15 A
FIG. 15 B

METHOD AND ASSEMBLY KIT FOR FORMING DEFINED LONGITUDINALLY WATERTIGHT SECTIONS IN WIRINGS COMPRISING A PLURALITY OF INDIVIDUAL STRANDS AND/OR CABLE STRANDS

The invention relates to a method for forming defined longitudinally water-tight sections in wirings comprising a plurality of individual strands and/or cable strands. Wirings of this type are mainly used for the electric and electronic control of functions. The invention also relates to an assembly kit for forming such local sealing sections.

In various industries, for instance the motor industry, there is frequently the problem of forming locally defined longitudinally water-tight sections in multiple-component wirings such as cable trees. This problem is primarily encountered in the vicinity of soldering terminals and when a wiring is passed through a partition, for instance from the engine space into the cabin of a vehicle. It is frequently also required to seal a wiring in a gas-tight and water-tight manner. If water is permitted to flow along the individual strands and/or cable strands of a wiring system, it causes severe corrosion at soldering terminals. If such longitudinally flowing water enters a plug connection it may lead to the occurrence of shortcircuits. This may result in heavy accidents in the case for instance of anti-locking break control systems. In the absence of a longitudinally water-tight sealing system at the location for instance of the passage of a wiring from the motor space into the central processing units of a motor vehicle, moisture may be permitted to enter said sensitive units.

It is therefore an object of the invention to provide a method permitting locally defined sections of wiring systems to be sealed against the longitudinal flow of water.

This object is attained by the invention as defined in claim 1.

The assembly kit according to the invention permits the method according to the invention to be implemented and enables existing wirings to be locally sealed.

According to the invention, an assembly kit of this type consists of a heat-shrinkable component adapted to re-shrink to a reduced diameter in response to being heated, and a core made of a material adapted to expand temporarily or permanently to an enlarged cross-section in response to being heated and containing, or consisting of, a thermoplastic melt adhesive, said shrinkable component and said expandable core material defining a space therebetween, preferably an annular space for receiving individual strands or cable strands therein.

The technical progress to be achieved by the invention (method and assembly kit) results from the fact that after the expanding plastic core element has been embedded, the heat-shrinkable component has been mounted and the heat treatment has been carried out, the individual strands, or cable strands are sealed in a longitudinally water-tight (gas-tight) manner both between one another and over the entire cross-sectional area of the wiring, since the thermoplastic melt adhesive has penetrated into all of the voids between individual strands and/or cable strands as a result of the pressure exerted on the wiring by the heat-shrinkable component as it is being tightly shrunk thereabout, and of the pressure exerted by the expanding core element from within the wiring.

In performing the method according to the invention, at least one plastic element adapted to expand to an enlarged cross-sectional shape in response to a heat treatment and containing, or consisting of, a thermoplastic melt adhesive or a (cross-linkable) plastic material, respectively, is embedded between the conductor strands of the wiring. It is of decisive importance that the application of heat causes the plastic element to increase its diameter and to create an internal melt flow penetrating into the spaces between the conductor strands of the wiring so as to completely fill these spaces. The volume increase of the plastic element to be embedded resulting from the application of heat will of course result in a pressure increase within the wiring, whereby the melt adhesive is forced into the spaces to be sealed. It is obvious that the sealing system according to the invention may be applied to one or several locally defined sections of a wiring of extended length, but that it is also possible to seal wiring sections of considerable length in a longitudinally water- and gas-tight manner by the method according to the invention.

In a preferred embodiment of the invention, the heat-shrinkable component surrounding the wiring at the location to be sealed has its interior surface coated with a melt adhesive. The heat treatment causes this melt adhesive coating to melt and to be forced into the spaces of the section to be sealed between the separate conductor strands by the two above-mentioned pressure components (internal and external).

It is to be emphasized that the pressure forces acting on the section to be sealed from its interior and its exterior are due to the provision, respectively, that in the case of the exteriorly acting pressure a previously radially expanded shrinkable component is caused to re-shrink to its smaller original diameter by the application of heat, and that in the case of the internally acting pressure the embedded plastic element exerts an outwards directed pressure from within as a result of its expansion, i.e. as a result of the temporary or permanent increase of its cross-sectional area in response to the heat treatment. As already mentioned, these two oppositely directly pressure components are effective to force the thermoplastic melt adhesive into the spaces to be filled after the adhesive has been softened by the heat treatment.

The plastic elements to be embedded according to the invention may be of various types, namely, (a) elements consisting of a core made of a cross-linkable plastic material and an outer layer of a thermoplastic melt adhesive extruded on the core, (b) elements not provided with a core of a cross-linkable plastic material and consisting solely of a thermoplastic melt adhesive of a type causing the plastic element, after having been pre-stretched in its longitudinal direction, to re-assume its original (nonstretched) configuration, accompanied by an increase of its diameter, in response to a subsequent heat treatment, and (c) elements substantially consisting of a heat-responsive adhesive adapted to expand, accompanied by the formation of foam, in response to the application of heat, to thereby penetrate into any voids encountered in the section to be sealed.

Further preferred embodiments of the invention are set forth in the subclaims.

Figure 2:
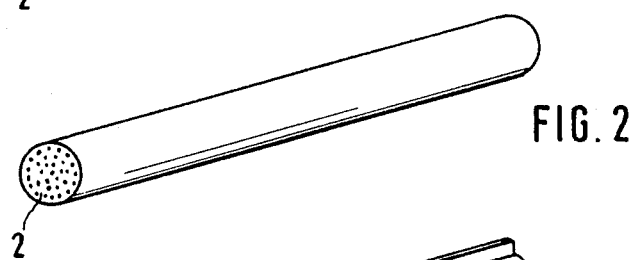
Figure 3:
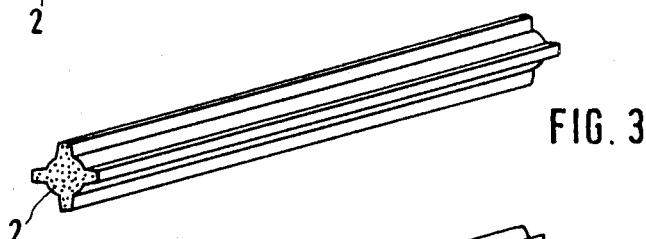
Figure 4:
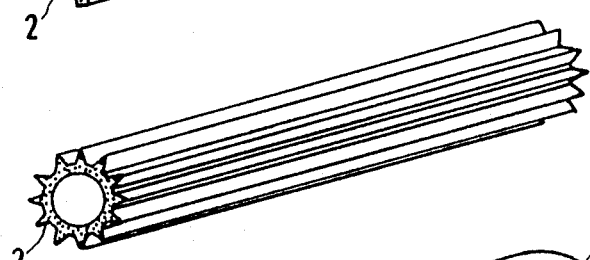
Figure 5:
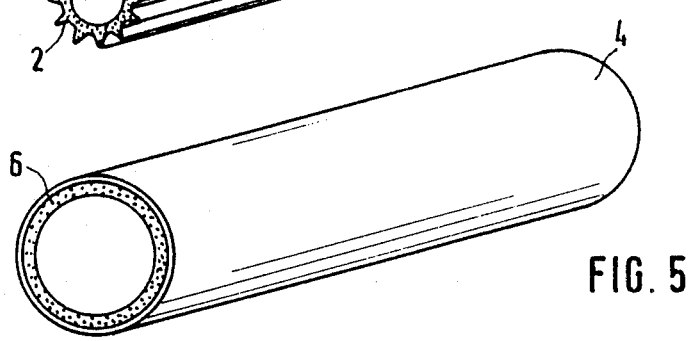
Figure 6:
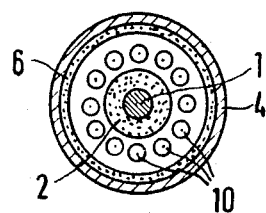
Figure 10:
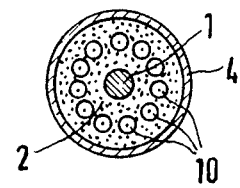
Figure 7:
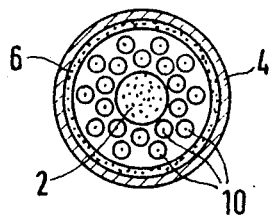
Figure 11:
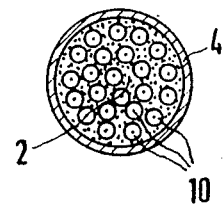
Figure 8:
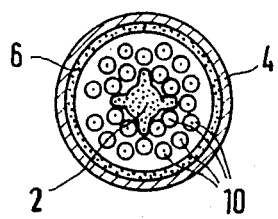
Figure 9:
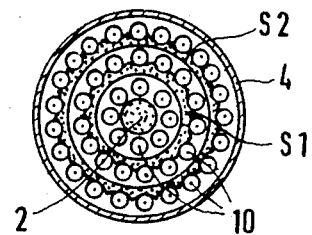

Embodiments of the invention shall now be described by way of example with reference to the accompanying drawings, wherein:

FIG. 1 shows a perspective illustration of a section of a plastic element to be embedded, comprising a core of a cross-linkable plastic material and an outer layer of a thermoplastic melt adhesive extruded about the core, FIG. 2 shows a perspective illustration of a plastic element to be embedded made of an extruded thermoplastic melt adhesive without a core, FIG. 3 shows a perspective illustration of a plastic element to be embedded having longitudinally extending ribs, FIG. 4 shows a perspective illustration of a further plastic element for use in combination with plastic elements according to FIGS. 1 to 3 in an embodiment of the invention applicable to a wiring system having a greater number of conductor strands, FIG. 5 shows a perspective view of a section of a heat-shrinkable component having its interior wall surface provided with a coating of a thermoplastic melt adhesive, FIG. 6 shows a diagrammatic cross-sectional view of a wiring section to be sealed, including an assembly kit according to the invention prior to the heat treatment, with a plastic element as shown in FIG. 1 being centrally embedded in the wiring bundle, FIG. 7 shows a cross-sectional view similar to FIG. 6, prior to the heat treatment, but with the plastic element centrally embedded in the wiring being of the type shown in FIG. 2, FIG. 8 shows a cross-sectional view similar to FIG. 6, prior to the heat treatment, but with the plastic element being centrally embedded in the wiring being of the type shown in FIG. 3, FIG. 9 shows a cross-sectional view similar to FIG. 6, with the plastic element centrally embedded in the wiring being of the type shown in FIG. 2, another two plastic elements of the type shown in FIG. 4 being provided between the central plastic element and the surrounding heat-shrinkable component, the assembly being shown prior to the heat treatment, FIG. 10 shows a cross-sectional view of a wiring bundle sealed by means of the arrangement shown in FIG. 6 after heat treatment, FIG. 11 shows a cross-sectional view of a wiring bundle sealed by the arrangement shown in FIG. 9 after heat treatment, FIG. 12 (a-d) shows a diagrammatic illustration of successive steps when applying the invention to conductor connections in the form of soldered splicing, FIG. 13 shows a sectional view of a preferred embodiment of an annular melt adhesive core element, FIG. 14 shows a sectional view of another preferred embodiment of an annular melt adhesive core element, and FIG. 15A and FIG. 15B show diagrammatic illustrations of a longitudinal water-tight sealing arrangement on opposite sides of a soldered connection.

In the following description, the term "conductor strand" is used as a collective term for "individual strands and/or cable strands".

The plastic element shown in FIG. 1 comprises a core 1 made of a cross-linkable plastic material, for instance a suitable polyethylene composition, and an outer layer 2 made of a melt adhesive extruded about core 1. FIG. 6 shows a plastic element 1, 2 of this type embedded in a conductor lane comprising a plurality of conductor strands 10, in the state prior to a heat treatment. FIG. 11 depicts the state after the heat treatment has been carried out.

After the thermoplastic melt adhesive 2 has been extruded about core 1 consisting of a cross-linkable plastic material, the system formed by these two components is at least partially cross-linked, to which purpose the material is exposed to beta or gamma radiation or subjected to a chemical treatment, whereby the cross-linking of the core material, for instance polyethylene, is brought about Depending on additives contained in melt adhesive 2, this treatment may also result in the outer layer material being cross-linked to a suitable degree.

After the core and optionally also the outer layer material, has or have been thus cross-linked, the element shown in FIG. 1 is stretched in the direction of its longitudinal axis. This stretching step is preferably carried out at a stretching rate of 2:1 or 3:1 or 4:1, the relationship between the outer diameter of the melt adhesive outer layer 2 and the outer diameter of the (polyethylene) core 1 being preferably 2:1 or 3:1 or 4:1.

In the embodiment shown in FIG. 1, core 1 is in the shape of a rod of circular cross-sectional shape. The melt adhesive outer layer 2 extruded thereabout is therefore of circular annular cross-sectional shape.

For locally sealing a multiple-conductor wiring a plastic element is (partially) cross-linked and longitudinally stretched as explained above, and is then positioned in the wiring preferably along the longitudinal axis thereof, so that the conductor strands 10 are evenly distributed around the outer surface of the outer melt adhesive layer 2 as shown in FIG. 6. Subsequently a radially pre-stretched and optionally cross-linked heat-shrinkable component is mounted on the wiring system. In the course of a subsequent heat treatment, which according to the present invention is carried out at a temperature of about 80° to 155° C., measured within the sealing portion the thermoplastic melt adhesive 2 is activated, and the radially pre-stretched heat-shrinkable component is caused to contract towards its original smaller diameter. The heat treatment further causes the longitudinally stretched core 1 to contract and to thereby expand to its original larger diameter, so that there occurs a pressure rise in the space between heat-shrinkable component and plastic element 1,2, as a result of which the softened melt adhesive 2 is forced into the spaces between the conductor strands 10.

In the embodiment of FIG. 2, the plastic element does not include an inner core but consists solely of a thermoplastic melt adhesive. This melt adhesive is of such a composition, or cross-linked in such a manner, that the longitudinally pre-stretched element will contract in response to being subsequently heated, accompanied by a temporary or permanent enlargement of its cross-sectional shape. The employed melt adhesive is preferably of a type in which the heat treatment induces the formation of foam in the form of closed pores or cells.

In practical use the plastic element shown in FIG. 2 is embedded in the section of a conductor strand bundle to be sealed in the manner described with reference to FIG. 1, and subjected to a heat treatment after a heat shrinkable component section has been mounted also in the manner described with reference to FIG. 1. Since the heat treatment causes the pre-stretched plastic element of FIG. 2 to return to the shape it had prior to the pre-stretching step, the diameter of the plastic element expands during the heat treatment, so that an outwards directed pressure is created within the section of the wiring surrounded by heat-shrinkable component 4, as a result of which the softened melt adhesive is forced into the spaces between the conductor strands 10.

The pre-stretching of the plastic element of FIG. 2 is preferably carried out as described with reference to FIG. 1, i.e. at a stretching ratio of 2:1 or 3:1 or 4:1. Foaming melt adhesives are not pre-stretched.

FIG. 7 shows the manner in which a core-less plastic element of the type shown in FIG. 2 is positioned within a bundle of conductor strands along the longitudinal axis thereof. The individual conductor strands 10 are disposed between melt adhesive element 2 and the surrounding heat-shrinkable component 4. FIG. 7 shows the assembly of heat-shrinkable component 4 conductor strands 10 and centrally located plastic element 2 prior to the finishing heat treatment. FIGS. 3 and 4 likewise show coreless plastic elements made of a cross-linkable thermoplastic melt adhesive or of a heat-responsive temporary or permanent foam-forming melt adhesive. The plastic element shown in FIG. 3 has a cross-sectional configuration similar to the shape of a maltese cross, including four pockets in the form of grooves or flutes extending between the arms of the cross in the longitudinal direction of the element.

Each of these pockets is adapted to receive one or several conductor strands therein. The plastic element may also suitably be of star-shaped cross-sectional configuration. FIG. 8 shows a cross-shaped plastic element of the type shown in FIG. 3 positioned along the longitudinal axis of a multiple-strand wiring with two conductor strands 10 being disposed in each of the four pockets. The conductor strands received in the four pockets are surrounded by a plurality of further conductor strands, as shown in FIG. 8.

The plastic element shown in FIG. 4 is formed as a hollow member comprising a plurality of longitudinally extending pockets for the accommodation of individual conductor strands therein formed on its outer surface. The plastic element shown in FIG. 4 consists of a cross-linkable thermoplastic melt adhesive or of a heat-responsive foam-forming melt adhesive and may be cross-linked and longitudinallly pre-stretched prior to use in the same manner as described with reference to FIGS. 2 and 3. Its should be noted that the receiving pockets are preferably dimensioned so that no more that two conductor strands can be accommodated therein.

The employ of the plastic element (melt adhesive element) shown in FIG. 4 is illustrated in FIG. 9. For instance the plastic element of FIG. 4 is used for longitudinally sealing in a water- and gas-tight manner wirings including a great number of conductor strands. In the embodiment depicted in FIG. 9, eight conductor strands are disposed around a melt adhesive core 2 positioned along the longitudinal axis of the wiring shown. These eight conductor strands are surrounded by a hollow member of the type shown in FIG. 4, with the plurality of pockets extending in its longitudinal direction accommodating a plurality of further conductor strands. This hollow member is designated by the reference designation S1 in FIG. 9. Hollow member S1 and the conductor strands retained thereon are surrounded by another hollow member of the type shown in FIG. 4. The hollow member is designated by the reference designation S2 in FIG. 9 and has a larger diameter than hollow member S1. As in all of the previously described embodiments, a heat-shrinkable component 4 is mounted at least on the outermost conductor strand array. An arrangement of the type depicted in FIG. 9 is preferably assembled in successive steps by the use of intermediate heat-shrinkable components not shown in FIG. 9.

As the assembly shown in FIG. 9 is subjected to a heat treatment, the heat activation of the melt adhesive elements 2, S1, S2 made of a pre-stretched or foam-generating material and the re-contraction of the outer heat-shrinkable component 4 and the preferably employed (not shown) intermediate shrink component results in a substantial pressure rise in the respective wiring section, as a result of which the melt adhesive softened by this head treatment is forced into all of the voids within the heat-shrinkable components. The state of the assembly of FIG. 9 after heat treatment is depicted in FIG. 11. The intermediate shrinkable components are not visible in the drawing; their employ in successive re-contraction steps is advisable, however, in order to avoid overheating or excessive processing temperatures.

The melt adhesive elements and the respective heat shrinkable components adapted thereto permit any number of circular conductor arrays of different diameters to be assembled in the manner described.

Shown in FIG. 5 is a per se known heat-shrinkable component 4. Heat-shrinkable components are usually commercially available in a pre-stretched state and resume their original unstretched configuration in response to a heat treatment. The deformation from which a shrinkable component resumes its original configuration in response to a heat treatment may also be imparted to the shrink hose as it is being mounted on the outer periphery of a cable bundle.

In accordance with a preferred embodiment of the invention, the heat-shrinkable component 4 shown in FIGS. 5,6,7, and 8 is provided with an interior coating 6 of a thermoplastic melt adhesive. This melt adhesive coating 6 is softened by the finishing heat treatment and penetrates inwards into the spaces between the conductor strands, in addition to the melt adhesive forced outwards from the interior of the wiring.

The above described plastic or melt adhesive elements, irrespective of whether or not provided with a core, may selectively be formed as a rod having a circular cross-section (FIGS. 1 and 2), a solid profile rod member (FIG. 3) or a profiled hollow member as shown in FIG. 4. Further melt adhesive elements to be thus embedded are shown in FIGS. 13 and 14. All of the embodiments shown are based on the principle that the inwards acting pressure is created by the re-contraction of a pre-stretched heat-shrinkable component and the outwards directed pressure is created by the re-orientation or re-contraction of a longitudinally pre-stretched material or by the expansion, respectively, of a melt adhesive capable of foaming in response to being heated.

In the latter case the material employed is a heat-responsive melt adhesive of a composition adapted in response to a heat treatment to expand temporarily or permanently to an enlarged diameter or an enlarged cross-sectional configuration, respectively, accompanied by the generation of a closed-cell foam in response to the application of heat. The melt adhesive coating 6 on the interior surface of the shrinkable component 4 shown in FIG. 5 preferably consists of a melt adhesive capable of forming a closed-cell foam in response to being heated.

The expansion of the melt adhesive brought about according to the invention by the heat treatment, be it by a re-contraction to an original cross-sectional configuration or by the foam-generation in the case of a foam-generating melt adhesive, cooperates with the re-contraction of the surrounding shrinkable component brought about by the same heat treatment to create a melt flow within the cable bundle, whereby the individual conductor strands of the wiring are sealed in a gas-tight and longitudinally water-tight manner.

The assembly kit according to the invention is shown in FIGS. 6 to 9 in its state before the heat treatment, and in FIGS. 10 and 11 after the heat treatment.

This assembly kit comprises a heat-shrinkable component 4 adapted to be re-shrunk to a reduced diameter by the application of heat, and a core made of a material adapted to expand temporarily or permanently to an enlarged cross-section in response to being heated and consisting of, or containing, a thermoplastic melt adhesive. According to FIG. 6 this core may consist of an inner core 1 made of a cross linkable plastic material and an outer layer of a thermoplastic melt adhesive 2 surrounding the inner core. According to FIG. 7 the core consists solely of a thermoplastic melt adhesive 2 preferably of a foam-generating type. The cores of FIGS. 6 and 7 are of circular cross-sectional shape.

The core shown in FIG. 8 has a cross-sectional shape similar to a maltese cross, the spaces between its four cross arms being formed as pockets for receiving individual strands and/or cable strands therein. It is also possible to employ star-shaped cross-sectional configurations having five arms for instance.

In the assembly kit shown in FIG. 6 the system of inner core 1 and thermoplastic melt adhesive 2 is at least partially cross-linked. After the cross-linking process the inner core and outer melt adhesive layer are longitudinally pre-stretched as a unit. With regard to specific details, reference is made to the respective description of the method according to the invention.

The cores depicted in FIGS. 7 and 8 may consist of a thermoplastic melt adhesive being of a composition and/or cross-linked in such a manner that the application of heat causes it to re-contract after having previously been pre-stretched in the longitudinal direction. Preferably, however, the cores consist of a material capable of expanding by the generation of foam in response to the application of heat.

Defined between the surrounding heat-shrinkable hose section and the core is a space for the accommodation of the wiring system comprising a plurality of conductor strands 10.

The assembly kit according to the invention is employed as follows:

A plurality of conductor strands 10 is distributed in the most uniform manner possible between the core and the surrounding heatshrinkable component as shown in FIGS. 6, 7 and 8. A heat treatment in the temperature range of about 80° to 155° measured with the sealing portion causes the surrounding shrinkable component 4 to shrink from the relative large diameter shown in FIGS. 6 to 9 to the relatively small diameter shown in FIGS. 10 to 11, so that the heat-shrinkable component exerts an inwards directed force. At the same time the heat treatment causes the core to expand, accompanied by a softening of the thermoplastic melt adhesive of which the core is at least partially formed. As already mentioned, the core shown in FIGS. 7 and 8 consists solely of a melt adhesive, while the core shown in FIG. 6 consists of a melt adhesive 2 surrounding a central inner core 1. The expansion of the core in response to the application of heat may be based on the principle that the material forming the core has been previously partially cross-linked and subsequently pre-stretched in the longitudinal direction. The heat treatment causes the pre-stretched material to resume its original shape, which in the case of a substantially rod-shaped core is accompanied by an enlargement of the cross-sectional dimensions, with the result that the melt adhesive softened by the heat treatment penetrates into any existing voids.

Instead of a cross-linked and pre-stretched material the core may also be forced of a material capable in response to the application of heat of generating a closed-cell foam temporarily or permanently and of penetrating into any voids within the surrounding heat-shrinkable component.

In an embodiment of the assembly kit shown in FIG. 9, an inner tubular melt adhesive element S1 and an outer tubular melt adhesive element S2 are disposed between the surrounding heat-shrinkable component 4 and the core element 2 extending along the longitudinal axis of the wiring. The two tubular melt adhesive elements are of different diameters and have their outer surfaces formed with a plurality of pockets extending adjacent one another in the longitudinal direction. The pockets may be formed as groove-like recesses in the material or defined by circumferentially spaced webs extending in the longitudinal direction.

The two tubular members S1 and S2 are made in the same manner as the cores described above with reference to FIGS. 7 and 8 and have the same properties. They consist thus either of a cross-linked thermoplastic melt adhesive compsed and cross-linked so that the application of heat in a pre-stretched state causes a re-contraction, or they consist of a material capable in response to the application of heat of foam generation to thereby expand temporarily or permanently and fill any existing voids. As already mentioned, the heat treatment of the assembly shown prior to such heat treatment in FIG. 6 results in the sealed section of a multiple-strand wiring system shown in FIG. 10 in a cross-sectional view. In this figure it is clearly shown that the melt adhesive 2 sealingly fills the space around the conductor strands 10 between the core and the heat-shrinkable component.

The assembly kit shown in FIG. 9 is advantageously employed for wiring systems having a great number of conductor strands. The wiring system shown in FIG. 9 prior to heat treatment comprises forty-five conductor strands 10. FIG. 11 shows that the heat treatment of the assemblies shown in FIGS. 7, 8 and 9 results in a respective sealed section in which the spaces between the individual conductor strands and the surrounding shrinkable component 4 are completely filled by the solidified (cross-linked) melt adhesive 2. As already mentioned, intermediate shrinkable components are preferably shrunk around the conductor strand arrays retained by elements S1 and S2.

The interior wall surface of the surrounding heat-shrinkable component 4 may advantageously be provided with a coating 6 of a thermoplastic melt adhesive. The melt adhesive of this coating 6 may be a material capable in response to being heated of generating a closed cell foam temporarily or permanently. The material of the interior coating 6, is preferably the same as, or similar to, the material of the heta-expandable melt adhesive elements or cores.

A particularly interesting application for the method and assembly kit according to the invention is the employ in a wiring comprising a plurality of electric conductors (individual strands) soldered to one another at their ends. FIG. 12a shows a wiring of this type, also referred to as "splicing", wherein four individual insulated strands are soldered to one another adjacent their ends and provided with a crimp. The individual strands are designated a, b, c and d. Connections of this type are obviously particularly endangered by corrosion. For sealing a splicing of this kind against longitudinal water flow, the electric conductors are separated to form two bundles having substantially the same number of conductors or the same overall cross-sectional area. Prior thereto a tubular plastic element consisting of, or containing, a melt adhesive 2 is mounted on one of the conductor bundles as shown in FIG. 12a. As depicted in FIG. 12b, the tubular plastic element (hot melt adhesive element) is longitudinally slipped over the crimp of the solder connection e, the diameter of the tubular element being selected so that the tubular element is fixedly retained on the crimp.

FIG. 12b shows a sideview for explaining the arrangement of FIG. 12b.

After a heat-shrinkable component 4 has been slipped onto the above-described assembly, heat is applied for causing the shrinkable component to contract and the tubular plastic element to expand, until the softened melt adhesive has uniformly advanced to the ends of the shrinkable component.

In FIG. 12 the merely diagrammatically shown plastic element 2 consists at least partially of a thermoplastic melt adhesive capable in response to being heated of forming a closed-cell foam.

FIG. 13 shows a preferred embodiment of the tubular melt adhseive element 2. In this embodiment the handling of the melt adhesive element 2 is facilitated by the provision of an upper projection 12. Opposite handling projection 12 the melt adhesive element is formed with a thickened portion 13 acting as a melt adhesive supply. In the assembly shown in FIG. 12 the tubular melt adhesive element of FIG. 13 is suitably arranged so that thickened portion 13 is disposed at a location whereat the stripped ends of conductors a, b, c and d terminate at the solder connection or crimp, respectively. The thickened portion 13 thus ensures that there is a sufficient supply of melt adhesive at the location whereat there is a plurality of stripped conductors.

In the case of end closures of the type shown in FIG. 12c it is also possible to replace the shrinkable component by a shrink cap, i.e. a shrink component closed at one end.

FIG. 14 shows a preferred embodiment of a tubular melt adhesive element having a plurality of retaining pockets 14 distributed about its outer periphery. In the embodiment shown there are nine such retaining pockets 14. The number of retaining pockets 14 may be increased or reduced as required. As already explained, each retaining pocket 14 is preferably adapted to retain no more than two individual strands or the like to thereby ensure that there are nowhere more than two individual strands or the like in direct contact with one another. In this manner it is ensured that there remain no voids between adjacent strands or cables into which the melt adhesive would not penetrate. In a triangle configuration for instance of three adjacent conductors or wires there would remain an outwards closed central void which would act as a highly disadvantageous moisture bridge. The pockets 14 are separated from one another by projections 16 extending radially from the outer circumferential surface of the tubular melt adhesive element. For permitting the tubular element shown in FIG. 14 to be readily positioned at any location of a wiring, it is longitudinally cut as indicated at 18. This longitundinal cut 18 permits the element shown in FIG. 14 to be readily opened for receiving a suitable number of conductors or strands in its interior. Preferably one or two cable strength of greater thickness may thus extend through the interior of the element. The tubular element shown in FIG. 14 is preferably formed with a longitudinally extending weakened portion to facilitate its being opened at cut 18. To this purpose the tubular element may have a longitudinally extending wall portion of reduced thickness.

In a further embodiment not shown in the drawing, a melt adhesive core may have a part-annular cross-sectional configuration with a sector of the circular shape missing. This configuration may also be referred to as a U-shaped channel. This profile permits the melt adhesive core to be readily installed in a wiring. If a closed tubular core were used the components of the wiring system would have to be threaded through its opening. Both the embodiment of FIG. 14 and the (not shown) U-channel hot melt adhesive core permit the components of the wiring to be readily positioned within the tubular or part-tubular core.

FIGS. 15a and 15b show a particular embodiment of the invention employing two melt adhesive cores. The two cores 2, 2' consist at least partially of a melt adhesive capable in response to being heated of forming a closed-cell foam temporarily or permanently.

Each melt adhesive core 2, 2' is formed as a U-shaped channel member, so that it may be readily mounted on an individual strand. In the arrangement shown in FIG. 16, the method or assembly kit, respectively, according to the invention is used for longitudinally sealing a connection of three electric conductors entering from the left to three conductors extending to the right. The mechanical connection of respective conductors is accomplished by a solder spot and a crimp e. For forming a longitudinally sealed section on opposite sites of the crimp e, the melt adhesive u-profiles 2 and 2' are mounted on the respective center strands. Subsequently a cross-linked and pre-stretched shrink hose 4 is mounted on the strands. Application of heat causes component 4 to re-contract and the material of melt adhesive cores 2, 2' to expand, accompanied by the formation of foam. The heat treatment is terminated when the melt adhesive material exits at the two end portions of the shrink component. As evident from FIG. 15b, water flowing along the individual strands in the longitudinal direction towards the soldered connection is absolutely prevented from penetrating the longitudinally sealed sections formed in accordance with the invention. At the same time the surrounding shrink component prevents any moisture from reaching the soldered connection and the associated crimp e in radial directions.

The preferred material for the heat-shrinkable components according to the invention is ethylene-vinylacetate copolymer, because the cross-linking of this material is relatively easy to control. The inwards directed force exerted by the heat-shrinkable components during their contraction is greater than the outwards directed force exerted by the melt adhesive core within the section to be sealed. The contraction of the heat-shrinkable component forces the softened melt adhesive material to flow in the longitudinal direction of the individual strands or cable strands, the overall volume remaining substantially constant prior to and after the shrinking step. The force exerted by the contraction may be additionally controlled by suitably selecting the wall thickness of the material. This applies in particular to shrink components consisting of polyethylene.

The components of the assembly kits according to the invention are suitably selected with a view to their intended use. Thus when the temperatures at the location of use are not expected to rise above 85° C., as for instance in the body structure of motor vehicles, a thermoplastic melt adhesive having a melting temperature of about 90° to 95° C. would be suitable, for instance a polyamide. If the temperatures to be expected during use are higher, for instance 105° C., as in the engine compartment of a motor vehicle, use is made of melt adhesives of a higher viscosity. The desired viscosity can be rather accurately controlled by the pre-cross-linking induced in the material. It is thus for instance possible to combine a pre-cross-linked melt adhesive material consisting of EVA with a shrinkable component consisting of PE.

Still higher temperatures of for instance 125° C. require the use of suitable materials having a higher viscosity brought about by a higher degree of cross-linking.

The method according to the invention may be performed, and the assembly kit according to the invention for performing this method may be made, respectively, by using a cross-linkable plastic material of any type in which at least partial cross-linking can be induced by electron radiation (beta or gamma radiation) or by chemical means. Examples of such materials are polyethylene LLDPE, LDPE or HDPE; polyamide PA; polyvinylidene fluoride PVDF; polyvinyl chloride PVC or mixtures of such materials. The crystallite melting point of thermoplastic melt adhesives preponderantly lies in the temperature range of about 60° to 125° C. The processing temperature of heat-shrinkable components lies in the temperature range of about 80° to 155° C., measured within the sealing position.

The cross-linkable plastic material employed for the inner core of the plastic core element according to the invention is preferably polyethylene. The outer layer formed on such a polyethylene inner core is preferably a thermoplastic melt adhesive on a polyamide base. The plastic core elements according to the invention having no inner core are preferably made of a thermoplastic melt adhesive consisting of ethylene-vinylacetate copolymer (EVA).

The foaming reaction of the melt adhesive in response to being heated is preferably brought about by the use of endothermic foaming agents decomposing at about 140° C. to thereby promote the formation of a closed-cell foam. An example of such a foaming agent is a composition sold under the designation "Hydrocerol" by the firm of Boehringer-Ingelheim.

In the assembly kits according to the invention, the length of the heat-shrinkable components is about three or four times that of the core elements (prior to use). In the case of solid core elements having a circular cross-section, preferably with recesses in their outer surface, and having a diameter of 3 to 8 mm, the longitudinal dimension may be about 10 mm. The associated heat-shrinkable components have a length of about 35 to 45 mm prior to shrinking.

Hollow members of circular cross-section (FIG. 4) preferably have a diameter up from 10 mm and a length of 10 to 25 mm. The associated shrink components have a length of 35 to 75 mm prior to shrinking.

The preferred shrinkable components having a diameter of about from 10 mm prior to shrinking, and of from 2 mm after shrinking. Preferably the shrink rate is 4:1 with a wall thickness after shrinking of for instance 2, 2 mm.

I claim:

1. A method for forming a defined longitudinally watertight section in a wiring system comprised of a plurality of individual strands, characterized by embedding at least one extruded plastic element formed of a thermoplastic melt adhesive between the individual strands of the wiring system, with the thermoplastic melt adhesive melting to a molten flowable state and swelling to an enlarged cross-sectional shape in response to being heated, and mounting a radially pre-stretched heat-shrinkable component around the outer periphery of said wiring system at the location of said section to be sealed, and subjecting the section to be sealed to a heat treatment for activating said thermoplastic melt adhesive to a molten flowable state and also swelling to an enlarged cross sectional shape, and also causing said heat-shrinkable component to shrink tightly about said wiring system.

2. A method according to claim 1, characterized in that said extruded plastic element is formed by extruding a cover layer of a thermoplastic melt adhesive about a core made of a cross-linkable plastic, subsequently at least partially cross-linking the element consisting of said core and said melt adhesive layer, and finally stretching said element in the longitudinal direction.

3. A method according to claim 2, characterized in that said core is polyethylene, and that said stretching step is carried out in a streching range between 2:1 and 4:1.

4. A method according to claim 2, characterized in that the ratio between the outer diameter of said melt adhesive layer provided on said core and the outer diameter of said core is in a range between 2:1 and 4:1.

5. A method according to claim 1, characterized in that said plastic element is embedded at a central location between the individual strands of said wiring system.

6. A method according to claim 1, characterized in that the extruded plastic element is formed as a profiled element.

7. A method according to claim 6, characterized in that the cross sectional profile of said extruded plastic element is selected such that no more than two individual strands are in contact with one another.

8. A method according to claim 7, characterized in that the outer periphery of said extruded plastic element is formed with recesses for receiving said individual strands therein.

9. A method according to claim 1, characterized in that the interior wall surface of said heat-shrinkable component is provided with a melt adhesive coating.

10. A method according to claim 9, characterized in that the interior melt adhesive coating of said heat-shrinkable component is formed of a melt adhesive material which foams in response to being heated so as to form closed pores.

11. A method according to claim 1, characterized in that for sealing a wiring system comprising a large number of individual strands, a number of said individual strands are disposed about an extruded plastic element to be embedded, made of a thermoplastic melt adhesive and having its outer periphery formed with longitudinal retaining grooves, and mounting a partially cross-linked and prestretched heat-shrinkable component about said extruded plastic element and said individual strands retained therein, subjecting the thus formed assembly to a heat treatment for activating said adhesive and shrinking said heat shrinkable component to form a shrunk assembly, and that a melt adhesive element having its outer periphery formed with a plurality of grooves for receiving another plurality of grooves for receiving another plurality of individual strands therein is subsequently mounted about said shrunk assembly.

12. A method according to claim 1, characterized by splitting said hollow plastic element laterally to enable threading of the individual strands through the hollow plastic element.

13. An assembly kit for forming a defined longitudinally water-tight section in a wiring system comprised of a plurality of individual strands, characterized by a heat-shrinkable component adapted to re-shrink to a reduced diameter in response to being heated, and at least one extruded plastic core of a thermoplastic melt adhesive which melts to a molten flowable state and also swells to an enlarged cross-section in response to being heated, with a space being defined between said heat-shrinkable component (4) and said extruded plastic core (1,2) for receiving individual strands (10) therein.

14. An assembly kit according to claim 13, characterized in that said core comprises an inner core (1) of a cross-linkable plastic material, and a cover layer of a thermoplastic melt adhesive (2) surrounding said inner core, and that said inner core and said cover layer are at least partially cross-linked with one another and stretched in the longitudinal direction after being cross-linked.

15. An assembly kit according to claim 14, characterized in that the ratio between the outer diameter of said melt adhesive cover layer (2) and the outer diameter of said inner core (1) is in a range between 2:1 and 4:1.

16. An assembly kit according to claim 13, characterized in that said core consists solely of a thermoplastic melt adhesive (2) composed and cross-linked to reshrink after being longitudinally stretched and subsequently heated.

17. An assembly kit according to claim 13, characterized in that said extruded plastic core consists of a thermoplastic melt adhesive which foams in response to being heated, to thereby form closed pores.

18. An assembly kit according to claim 13, characterized in that said extruded plastic core is formed as a profiled element.

19. An assembly kit according to claim 13, characterized in that said extruded plastic core element has its outer peripheral surface formed with recesses for receiving individual strands of the wiring system therein.

20. An assembly kit according to claim 19, characterized in that said recesses are dimensioned to accommodate no more than two individual strands therein.

21. An assembly kit according to claim 13, characterized by providing in the space between said core (1,2) and said heat-shrinkable component (4) at least one tubular member (S1, S2) consisting of a partially cross-linked and pre-stretched thermoplastic melt adhesive adapted to expand by the development of foam in response to being heated, and having its outer surface formed with a plurality of longitudinally extended recesses for receiving cable strands (10) therein.

22. An assembly kit according to claim 13, characterized in that the interior surface of said heat-shrinkable component (4) is provided with a coating (6) of a thermoplastic melt adhesive.

23. An assembly kit according to claim 22, characterized in that the interior coating (6) of said heat-shrinkable component (4) consists of a thermoplastic melt adhesive which foams in response to being heated, to thereby form closed pores.

24. An assembly kit according to claim 13, characterized by said core (1,2) being formed as a hollow element for receiving individual strands threaded therethrough by splitting open said core laterally.

* * * * *